(12) United States Patent
Gregg et al.

(10) Patent No.: US 7,077,410 B2
(45) Date of Patent: Jul. 18, 2006

(54) VEHICLE SUSPENSION SYSTEM

(75) Inventors: John Stuart Gregg, Summerland (CA); Ian Edward Trip, Penticton (CA)

(73) Assignee: Peerless Limited, Penticton (CA)

( * ) Notice: Subject to any disclaimer, the term of this patent is extended or adjusted under 35 U.S.C. 154(b) by 0 days.

(21) Appl. No.: 10/238,853

(22) Filed: Sep. 11, 2002

(65) Prior Publication Data

US 2003/0020251 A1 Jan. 30, 2003

(51) Int. Cl.
*B60G 3/12* (2006.01)

(52) U.S. Cl. .................. 280/124.13; 280/124.128; 280/124.116

(58) Field of Classification Search .......... 280/124.128, 280/124.13, 124.116, 685, 81.1, 683, 124.153, 280/124.132; 267/276, 279, 281, 289; B06G 3/12
See application file for complete search history.

(56) References Cited

U.S. PATENT DOCUMENTS

| | | | | |
|---|---|---|---|---|
| 2,499,495 A | * | 3/1950 | Gregory | 280/788 |
| 2,748,879 A | * | 6/1956 | Bailey | 180/24.07 |
| 2,971,772 A | * | 2/1961 | Tantlinger et al. | 280/86.75 |
| 3,078,104 A | * | 2/1963 | Chalmers | 280/124.132 |
| 3,201,142 A | * | 8/1965 | Danguathier | 280/124.128 |
| 3,216,740 A | * | 11/1965 | Peras | 280/124.13 |
| 3,360,541 A | | 12/1967 | Korchinsky | |
| 3,406,980 A | | 10/1968 | Murray | |
| 3,642,302 A | * | 2/1972 | Hickman | 280/124.132 |
| 3,807,752 A | * | 4/1974 | Mauck | 280/81.1 |
| 3,918,738 A | | 11/1975 | Raidel | |
| 3,964,764 A | | 6/1976 | Rickardsson | |
| 4,132,433 A | * | 1/1979 | Willetts | 280/124.162 |
| 4,371,190 A | | 2/1983 | Vandenberg | |
| 4,415,179 A | * | 11/1983 | Marinelli | 280/124.116 |
| 4,589,677 A | * | 5/1986 | Matschinsky | 280/124.156 |
| 4,718,692 A | | 1/1988 | Raidel | |
| 5,083,812 A | | 1/1992 | Wallace et al. | |
| 5,203,585 A | * | 4/1993 | Pierce | 280/124.116 |
| 5,954,350 A | | 9/1999 | Santo et al. | |
| 6,286,857 B1 | | 9/2001 | Reese et al. | |

FOREIGN PATENT DOCUMENTS

| | | |
|---|---|---|
| CA | 2340102 | 2/2000 |
| CA | 2285796 | 9/2002 |

* cited by examiner

*Primary Examiner*—Ruth Ilan
(74) *Attorney, Agent, or Firm*—Shlesinger Arkwright & Garvey LLP

(57) ABSTRACT

A suspension system connects a wheel axle to a vehicle frame and includes a trailing arm connected at one end to the wheel axle. A pair of extension members are connected to the other end of the trailing arm and extend laterally in opposite directions along a pivot axis perpendicular to the longitudinal axis of the arm. A pair of supports extend along the pivot axis and are connected to the frame and rotatably connected to the extension member to permit pivotal movement of the trailing arm with respect to the frame about the pivot axis. The supports and extension members are dimensioned to provide a gap between the supports and extension members. A pair of resiliently deformable bearing members are interposed between the extension members and the supports in the gap. The gap and the bearing members are of sufficient width to permit limited rotational movement of the axle with respect to the frame about a vertical axis.

18 Claims, 8 Drawing Sheets

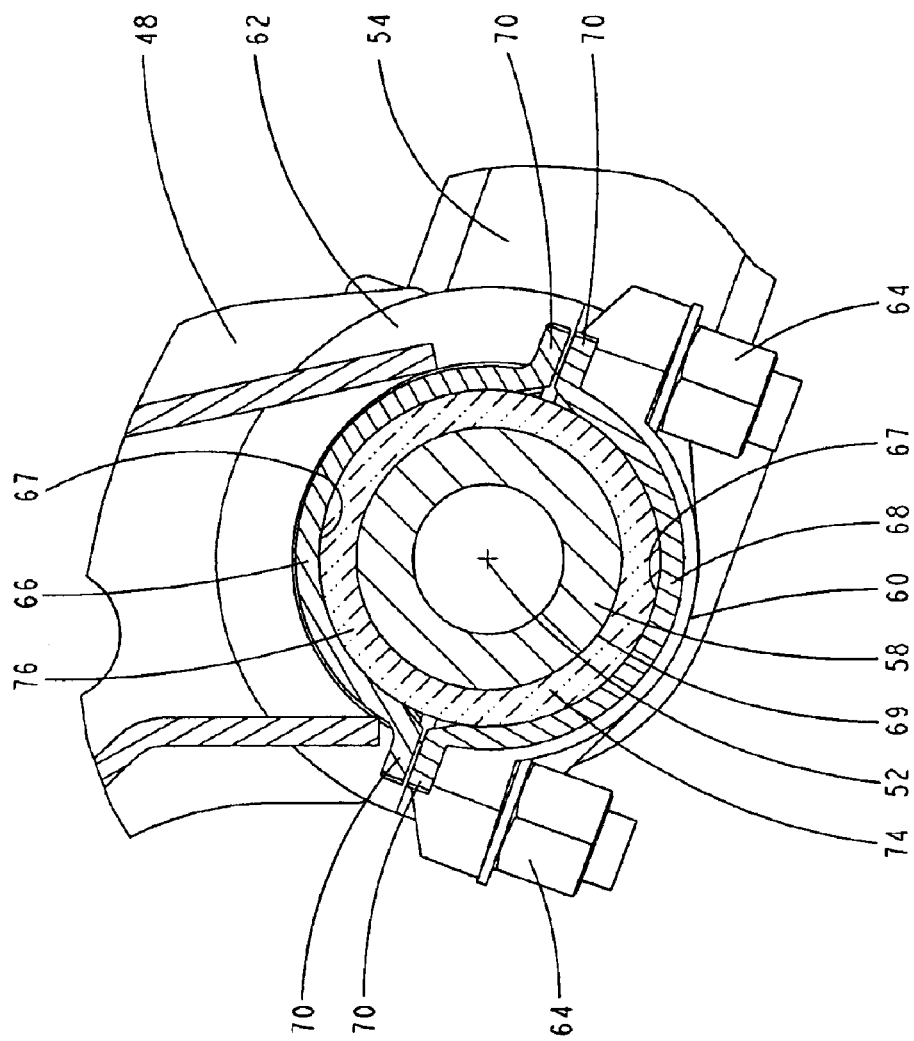

VEHICLE SUSPENSION SYSTEM

FIELD OF THE INVENTION

This invention relates to vehicle suspension systems and more particularly relates to trailing arm vehicle suspension systems wherein an axle is suspended from one end of a trailing arm which is pivotally connected to the frame to permit rotation of the axle about the pivot axis.

BACKGROUND OF THE INVENTION

This invention relates to vehicle suspensions for free rolling (i.e. non-driving axles) and has particular application to suspensions used with minimum width axles arranged in clusters of multiple axles having two or more axle assemblies mounted laterally opposed to each other across the width of the vehicle and one or more lines of axles mounted along the length of the vehicle, such is commonly employed on a trailer.

Suspensions of this type utilize air springs to support the load with pneumatic pressure. The air springs also deflect to absorb bumps and uneven road surfaces. The air springs are commonly interconnected for groups of axles with pneumatic hoses or pipes to provide equal pressure to groups of axles so that each axle within a connected group carries a relatively equal portion of the total load. This suspension is commonly referred to as a "trunnion axle suspension" meaning the axle is mounted on a swivel joint or trunnion that permits the axle to rock upwardly and downwardly relative to its longitudinal axis. This upward and downward motion is necessary to maintain ground contact and equal wheel loading for the wheels on both ends of each axle.

Lateral forces imposed on these types of axles are significant and they are caused by centrifugal turning forces, the lateral component of gravitational forces when the vehicle is on banked surfaces and most significantly, the lateral wheel skid force created when the cluster of axles is forced to turn. During turning the forward axles in the cluster must skid toward the inside of the turn while the rear axles skid toward the outside of the turn. This is known as "skid steer" force which is relatively high due to the coefficient of friction of the tires gripping the road and irregularities such as ruts in the road's surface.

In the prior art these lateral forces are resisted by a combination of the front suspension arm pivot bearing and a rear mounted sliding guide bearing that checks lateral movement of the suspension arm while permitting rotation of the arm about its pivot axis adjacent the frame. An example of such a system can be found in U.S. Pat. No. 6,286,857 to Fontaine et al. Fontaine employs a "cage" attached to the frame and sized to surround a bumper on the trailing portion of the trailing beam to prevent movement of the trailing beam horizontally transverse to the direction of vehicle travel while permitting movement of the trailing portion vertically.

It is common practice for these types of suspensions to use elastomer bearings at the points of articulation. These elastomer bearings absorb movement within the elastomer material (commonly a resiliently deformable material such as rubber) by its internal deflection. This eliminates surface against surface movement within the bearings and the wear associated with it. These elastomer bearings feature relatively long life and low maintenance (no lubrication is required) as the wear factor is virtually eliminated. Elastomer bearings, depending on their design, with allow a certain amount of axial misalignment, radial offset and axial offset as the elastomer deflects under load.

The sliding guide used in the prior art involves sliding surfaces and is prone to wear. This wear causes the guide clearance to increase over time and thus compromises suspension and axle alignment. There are also significant maintenance requirements required for this type of bearing. Other common methods have been employed to resist lateral forces such as rear mounted control rods, commonly known as "Panhard Rods". These rods are control rods mounted in a lateral orientation, having spherical or elastomeric joints at their ends. One end is anchored to the chassis while the other is anchored to the axle or suspension trailing arm. As the axle or trailing arm moves vertically, the end of the Panhard Rod attached to it will follow an arc path. Although the axle cannot move freely in a lateral direction, it is forced to move laterally a small amount due to the radial offset of the arc. This will cause misalignment of the axle as the suspension ride height changes. The use of a Panhard Rod can lead to greater suspension cost and maintenance and to increased tire wear.

Consequently, there is a need for a trunnion axle suspension system which eliminates the requirement for a mechanism which resists lateral forces on the arm, other than at the pivot axis of the trailing arm. This has the advantage of resisting lateral movement of the axle (that is rotation about a vertical axis and/or axial movement along the pivot axis) with respect to the frame in a controlled manner by means of resiliently deformable bearing members at the pivot axis only. This overcomes the problems associated with resisting or controlling this lateral movement of the trailing arm at a position remote of the pivot axis, where upward and downward motion of the trailing arm with respect to the frame occurs.

SUMMARY OF THE INVENTION

In a first embodiment of the invention a suspension system connecting a wheel axle to a vehicle frame is provided which includes a single trailing arm connected to the wheel axle for pivotal movement with respect to the frame about a pivot axis and an extension member connected to a first end of the trailing arm and extending along the pivot axis to define a pair of trailing arm support regions displaced apart from one another along the pivot axis. At least one of the support regions is positioned remote from the central longitudinal axis of the trailing arm. A support is connected to the frame and extends along the pivot axis adjacent the trailing arm support regions and a pair of bearing members are interposed between the extension member and the support each adjacent a corresponding trailing arm support region rotatably connecting the extension member and support together. The bearings act together to restrict axial movement of the trailing arm along the pivot axis and radial movement of the trailing arm away from the pivot axis so that rotational movement of the trailing arm about an axis perpendicular to the pivot axis is restricted.

In a further embodiment the extension member extends in opposite directions from the trailing arm along the pivot axis and the support regions are positioned on opposite sides of the trailing arm.

In another embodiment the axle includes a pair of wheel connecting means for connection of a pair of wheels to the axle and each of the wheel connecting means is on an opposite side of the central longitudinal axis of the trailing arm.

In another embodiment the pivot axis is substantially parallel to the longitudinal axis of the axle.

In another embodiment the pair of bearing members act on the extension member and the support to allow limited rotational movement of the trailing arm with respect to the frame about the axis perpendicular to the pivot axis within a predefined range of motion.

In another embodiment the support and extension member are dimensioned to provide a gap between the support and extension member and the bearing member is resiliently deformable and interposed in the gap between the extension member and the support. The gap and the bearing member are of sufficient thickness to permit limited rotational movement of the trailing arm with respect to the frame about the axis perpendicular to the pivot axis, upon deflection of the bearing members within the gap.

In another embodiment the length of each extension member is sufficient to limit lateral rotational movement of the wheel axle about a vertical axis within a predetermined range of movement defined by the width of the gap and the compressibility of the bearing member.

In another embodiment the length of the extension members is equal to the length of a corresponding support.

In another embodiment each extension member, each support and each bearing member is equal in length.

In another embodiment both extension members are displaced along the pivot axis from the longitudinal axis of the trailing arm.

In another embodiment the bearing members are deformable along their entire length.

In another embodiment a pin member connects each of the extension members together, the pin member connected to the first end of the trailing arm.

In another embodiment an axle connector connects the first end of the trailing arm to the wheel axle and a resiliently deformable axle connector bearing means is positioned within a gap between the axle and the axle connector. The gap is of sufficient width and the bearing member sufficiently deformable to permit the limited rotational movement of the axle with respect to the trailing arm about the vertical axis.

In another embodiment air bag suspension means are connected to a second end of the trailing arm and to the frame to support the load on the suspension.

In another embodiment a suspension system connects a wheel axle to a vehicle frame and includes a trailing arm connected to the wheel axle and a first connecting member pivotally connecting the trailing arm to the frame for rotation of the arm with respect to the frame about a pivot axis. A second connecting member is pivotally connecting the trailing arm to the frame for rotation of the trailing arm with respect to the frame about the pivot axis and the first and second connecting members are positioned along the pivot axis in spaced relationship with respect to each other. A pair of resiliently deformable bearing members are interposed between the connecting members and the trailing arm to permit limited lateral movement of the trailing arm with respect to the frame about a vertical axis upon deflection of the bearing members.

In another embodiment the first and second connecting members are positioned on opposite sides of the arm.

In another embodiment the length of each connecting member is sufficient to limit lateral rotational movement of the wheel axle about a vertical axis within a predetermined range of movement.

DRAWINGS

FIG. 8 is a cross-sectional view of an extension member, support and bearing member showing the pivotal connection of the trailing arm to the frame of the embodiment of FIG. 1.

DETAILED DESCRIPTION OF THE PREFERRED EMBODIMENT

Figure 1:
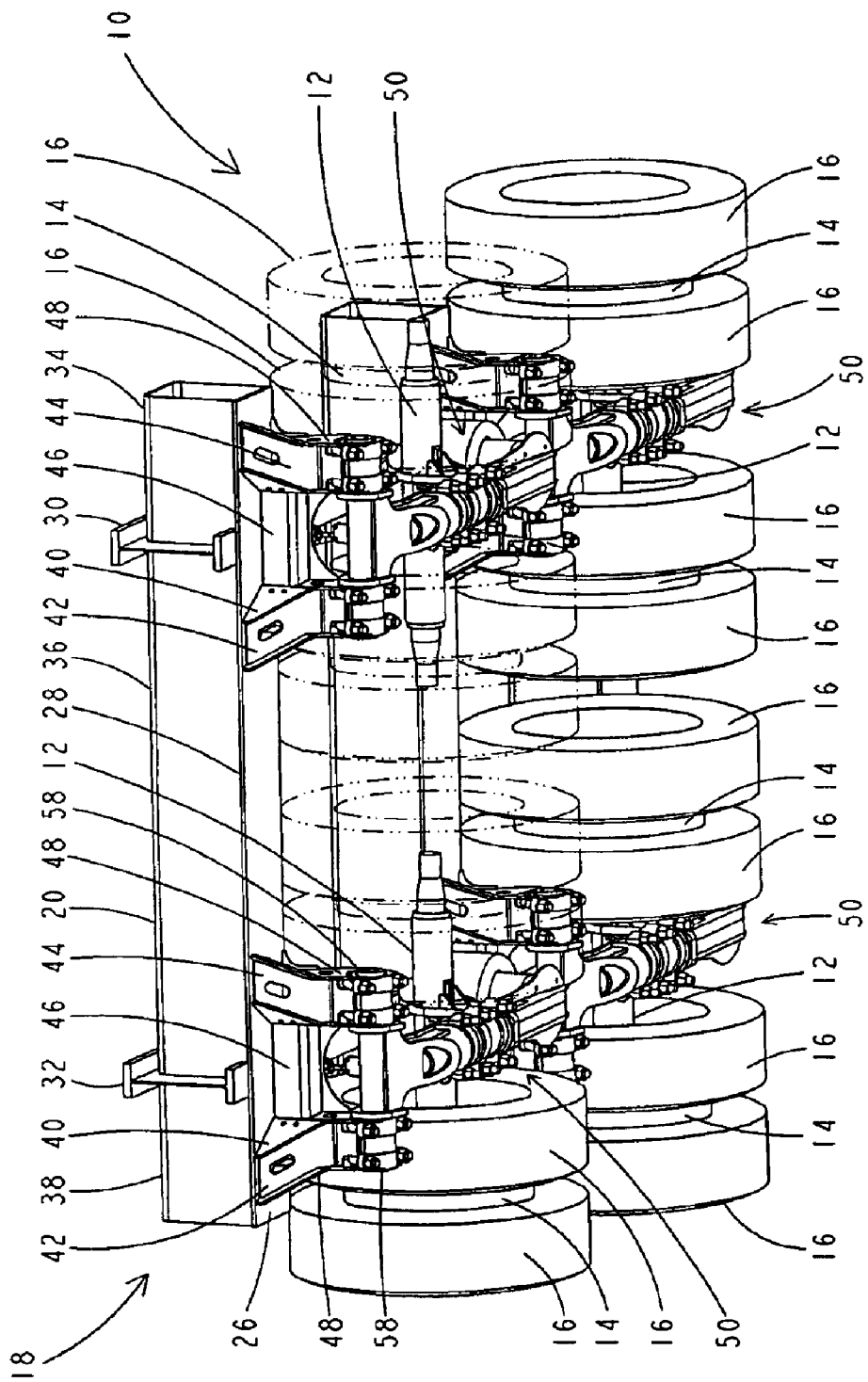
FIG. 1 is an oblique perspective view from the front of a multiple axle cluster showing the suspension system of the present invention connecting four axles, with four wheels per axle, to a vehicle frame.

FIG. 1 depicts multiple axle cluster 10 made up of four axles 12. Each axle 12 includes a pair of dual wheels 14 to which a pair of tires 16 are mounted. A pair of front axles 12 are positioned in parallel side-by-side alignment and a pair of rear axles are positioned in parallel side-by-side alignment. As well, front and rear axles 12 are aligned with one another parallel with the longitudinal axis of the vehicle and its direction of travel.

Figure 2:
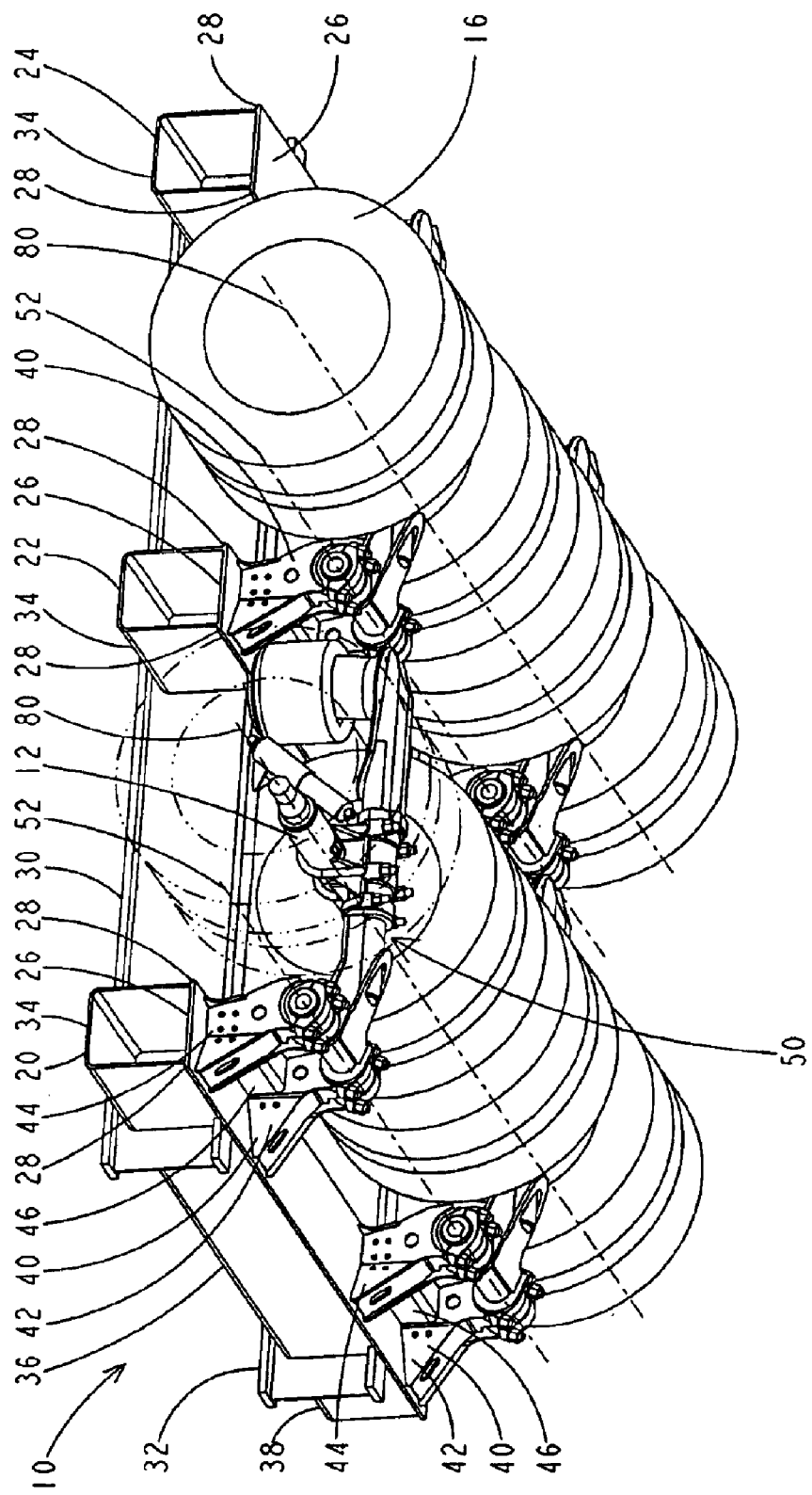
FIG. 2 is an oblique side perspective view of the embodiment of FIG. 1.
Figure 4:
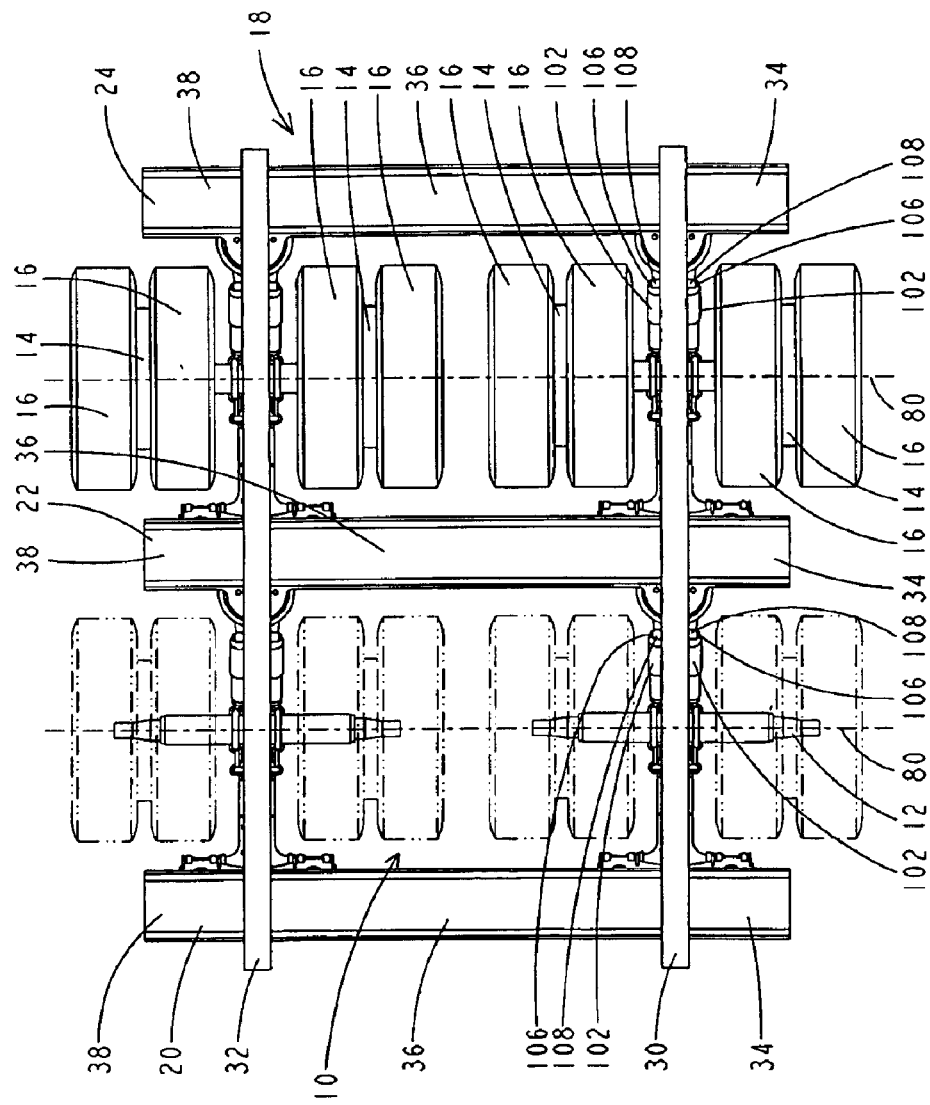
FIG. 4 is a top plan view of the embodiment of FIG. 1.

As seen best in FIG. 4, frame 18 is connected to the vehicle (not shown). Multiple axle cluster 10 is attached to frame 18 and thus to the vehicle in the manner hereinafter described. Frame 18 includes three spaced parallel cross member box beams, front box beam 20, middle box beam 22 and rear box beam 24. As depicted in FIG. 2, box beams 20, 22 and 24 are generally rectangular in shape for added structural support with lower side 26 including flanges 28 extending forwardly and rearwardly. Box beams 20, 22 and 24 extend from side-to-side with respect to the vehicle, that is in a direction perpendicular to the direction of travel of the vehicle and its longitudinal axis.

Still referring to FIG. 4, a pair of spaced parallel frame rails, left frame rail 30 and right frame rail 32 extend parallel with the longitudinal axis of the vehicle and its direction of travel. Frame rails 30 and 32 are interconnected with box beams 20, 22 and 24 trisecting box beams 20, 22 and 24 into left outboard section 34, longer mid section 36 and right outboard section 38. Rails 30 and 32 are I-beam shaped for added rigidity and box beams 20, 22 and 24 together with rails 30 and 32 form a rigid frame 18 to support the vehicle and to connect the vehicle with tires 16 as the vehicle travels.

Referring to FIG. 2, front box beam 20 and middle box beam 22 each include a pair of mounts 40 attached to lower side 26, each mount 40 corresponding to an axle 12 of cluster 10. As seen best in FIG. 1, mounts 40 include right member 42 and left member 44 extending downwardly in parallel spaced relationship connected by cross member 46. Members 42 and 44 include downward extensions 48 having a semi-cylindrical lower face (not shown). Extension 48 is best seen in FIG. 7.

Figure 5:
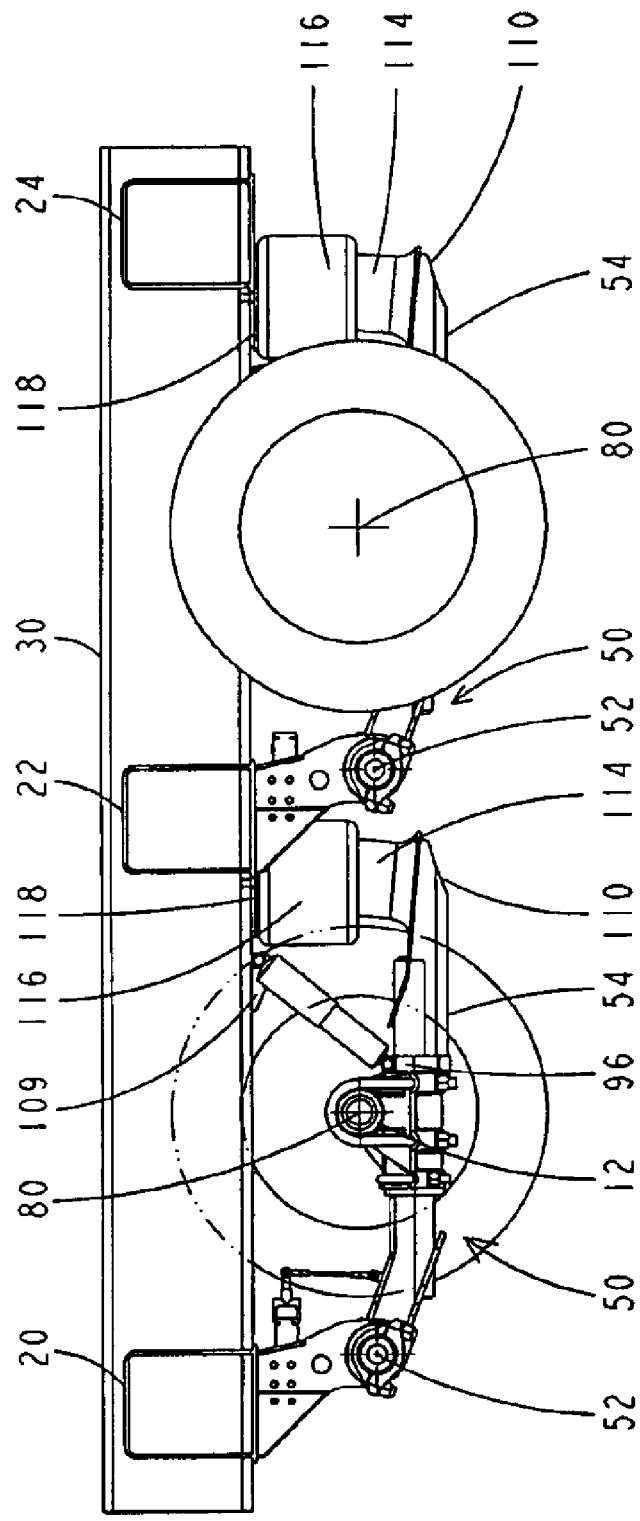
FIG. 5 is a side view of the embodiment of FIG. 1 with components removed.
Figure 6:
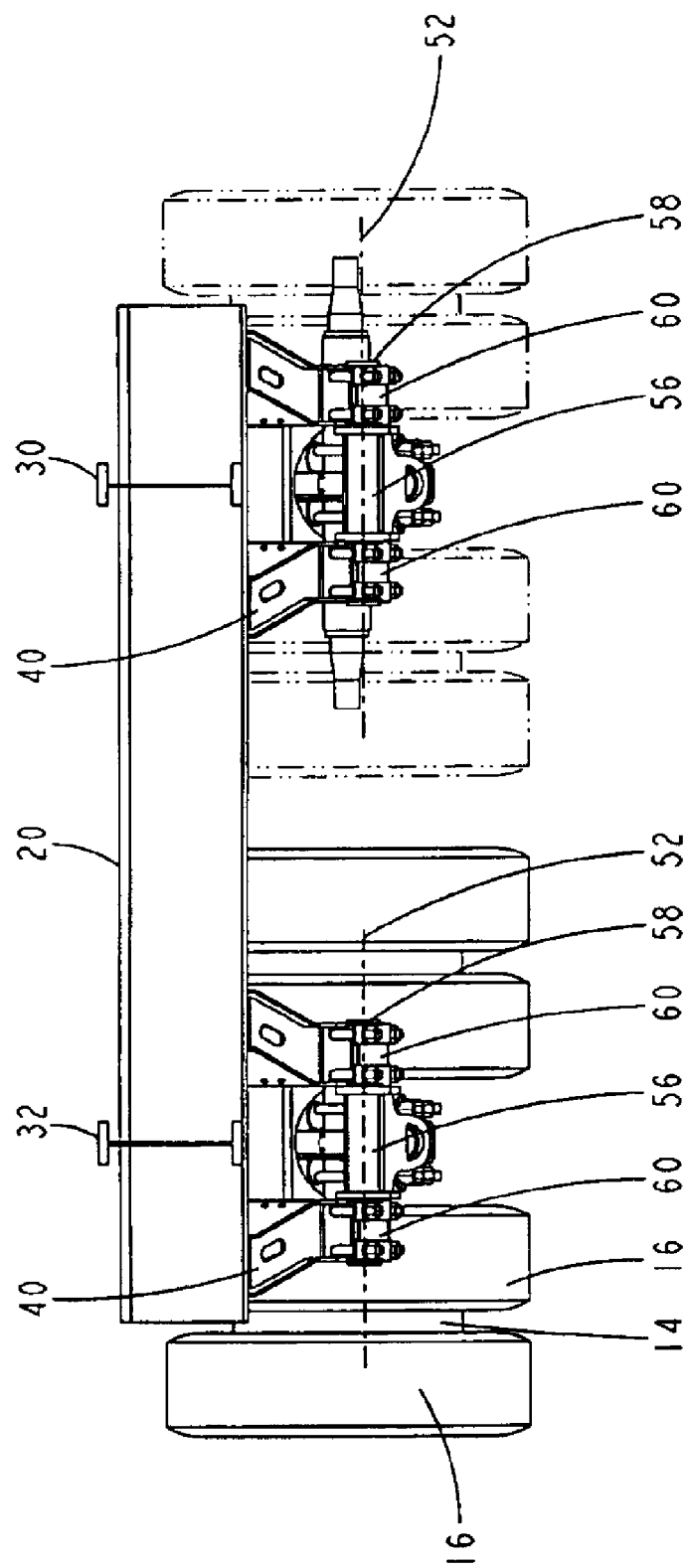
FIG. 6 is a front plan view of the embodiment of FIG. 1.
Figure 7:
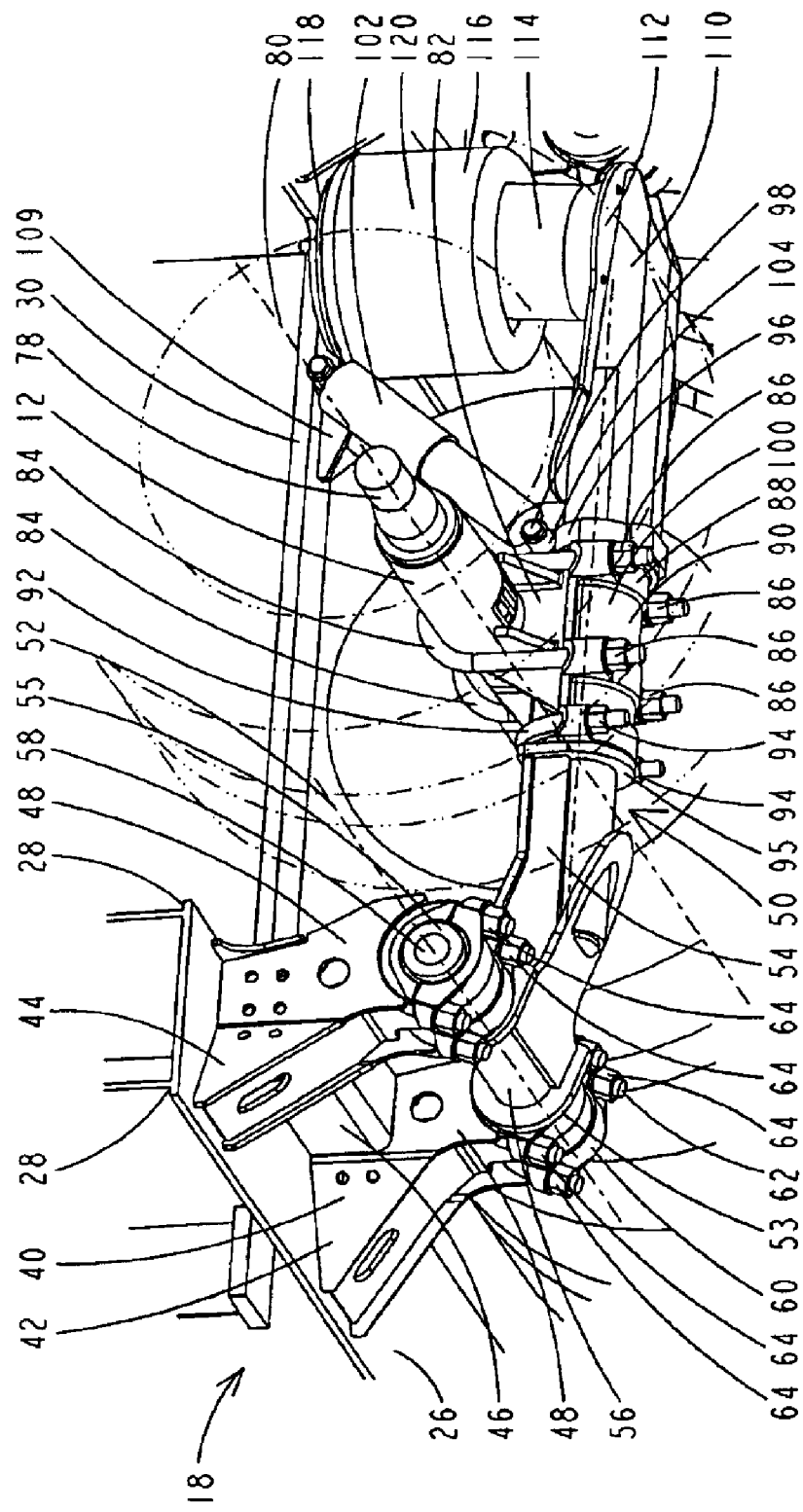
FIG. 7 is a close-up view of the suspension system of FIG. 1.

Referring to FIGS. 5, 6 and 7, trailing arm 50 is pivotally connected to extension 48 (and ultimately to frame 18) for pivotal rotation of arm 50 about a pivot axis 52. As depicted in FIG. 1, each multiple axle cluster 10 includes one trailing arm 50 for each axle 12, for a total of four trailing arms 50.

Referring to FIG. 7, trailing arm 50 includes beam 54 extending rearwardly from mount 40 in a direction parallel to the longitudinal axis of the vehicle and its direction of travel. A first or forward end 56 is rotatably attached to extension 48 of mount 40. End 56 includes a pair of extension members 58 connected to end 56 and extending in opposite directions along pivot axis 52. Members 58 are displaced apart from one another and are remote from the central longitudinal axis of the trailing arm 50. Extension members 58 are dimensioned in length from flange 53 to outer end 55 on each side of forward end 56.

A pair of bearing caps 60 are attached to respective downwardly extensions 48 of mount 40 by means of a pair of U-bolts 62 and corresponding nuts 64. Extensions 48 include openings to accept U-bolts 62 to secure caps 60 to extensions 48.

As depicted in FIG. 8, bearing cap 60 and extension 48 sandwich upper bearing housing 66 and lower bearing housing 68 together. Flanges 70 prevent rotation of housings 66 and 68 and mate to limit reduction of bearing space. Housing 66 and 68 are dimensioned with respect to extension member 58 such that inner face 67 of housing 66 has a greater diameter than outer face 69 of extension member 58 to provide gap 74 between housings 66, 68 and extension member 58. Resiliently deformable bearing members 76 are positioned within each gap 74 and extend along the length of each extension member 58. Each housing 66 and 68, as well as cap 60 and downward extension 48 extend in length (that is in a direction perpendicular to the vehicle direction of travel and longitudinal axis) a distance substantially equal to the length of each extension member 58. Resiliently deformable bearing members 76 permit rotation of extension member 58 about axis 52 with respect to housing 66, 68, extension 48 and mount 40 as well as frame 18. Resiliently deformable bearing members 76 act together to permit very limited rotational movement of extension member 58 with respect to downward extension 48 to permit rotation of axle 12 with respect to frame 18 within the confines of gap 74 about generally a vertical axis, that is about an axis which permits very limited radial displacement of trailing arm 54 horizontally. Bearing member 76 constructed of rubber of 70A shore hardness factor and thickness of one-half inch is suitable for use as a bearing member 76.

Referring to FIG. 7, axle 12 is connected at an intermediate region of beam 54. Axle 12 includes wheel bearing spindles 78 onto which are mounted the wheel bearings (not shown) and thus the wheel hubs (not shown) that are connected to dual wheels 14 at each end thus permitting dual wheels 14 and tires 16 to rotate about axis 80. Axle mounting seat 82 is attached to axle 12 by means of a pair of U-bolts 84 and nuts 86. Lower portion of axle mount seat 82 is cylindrical in shape to mate with cylindrical upper face of beam 54. Lower bearing cap 88 is also attached to U-bolts 84 and has an upper cylindrical face to mate with the lower face of beam 54 to sandwich beam 54 between bearing cap 88 and axle mounting seat 82. Bearing cap 88 is further secured to beam 54 by means of U-bolts 92 and nuts 94 at the front end of bearing cap 88. Open regions 90 are formed within bearing cap 88. Resiliently deformable bearing member 100 is positioned about beam 54 and sandwiched between axle mounting seat 82 and bearing cap 88 to permit movement of axle 12 with respect to frame 18 and to dampen vibrational movements. Axle seat locating flange plate 95 is located on trailing arm 50 ahead of axle 12 seat.

As also seen in FIG. 4 a pair of spaced opposed dampers or shock absorbers 102 are connected to flange 96 which is part of the rear portion of the trailing arm by means of bolt 98 extending through cylindrical shock absorber mount 104 (FIG. 7). The top ends of shock absorbers 102 are mounted to shock absorber frame bracket 109 that is fixed to left frame rail 30, as regards left front axle 12 of multiple cluster 10 by means of bolt 106 extending through upper shock absorber mounts 108. Resiliently deformable bearing members are interposed between bolt 98 and mounts 104 and bolt 106 and mounts 108 to facilitate movement of axle 12 with respect to frame 18.

Figure 3:
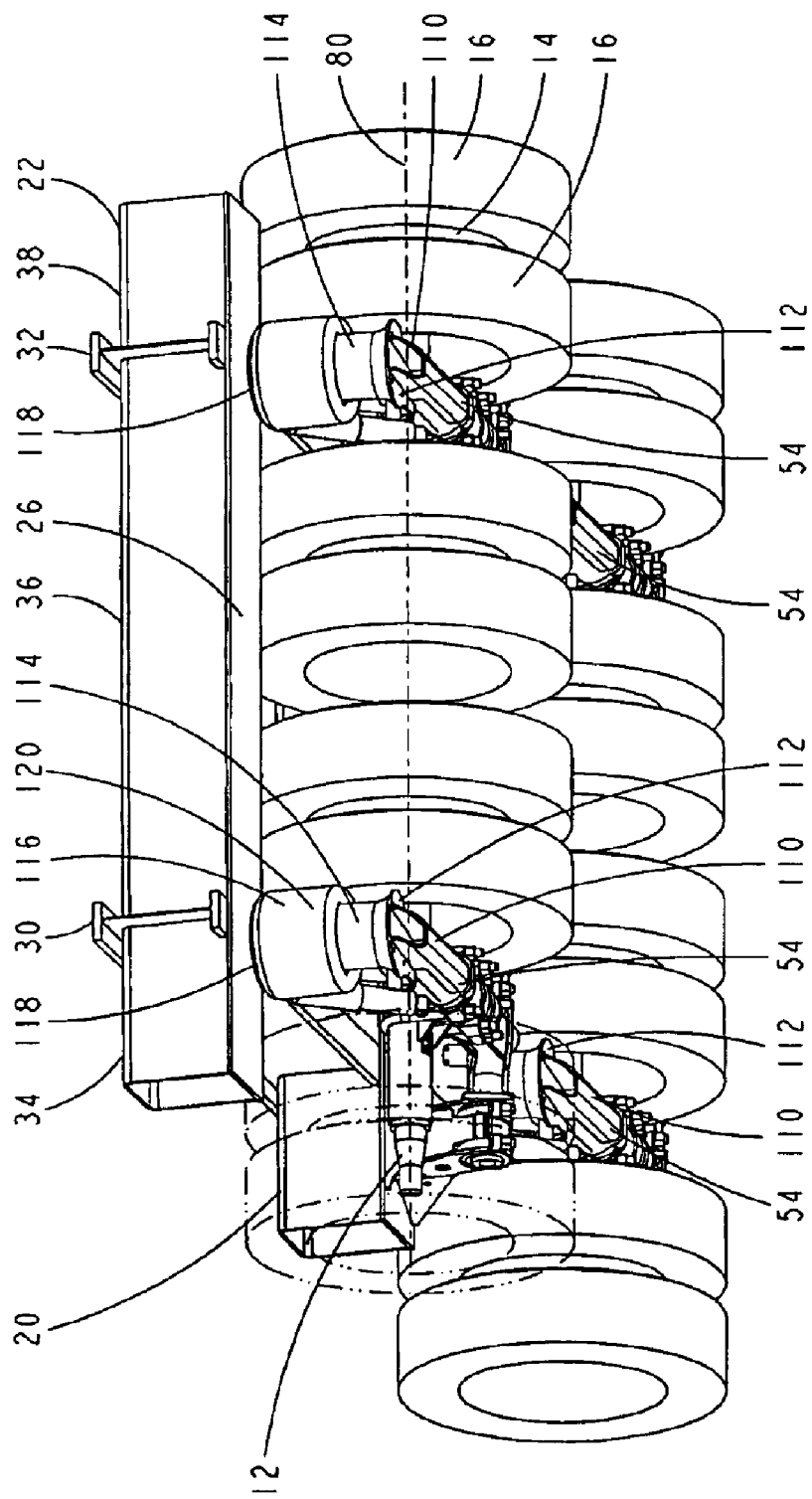
FIG. 3 is an oblique rear perspective view of the embodiment of FIG. 1.

As seen best in FIGS. 3 and 5, rear end 110 of beam 54 of arm 50 includes circular mount 112 on an upper portion of end 110. Piston member 114 is positioned on mount 112 and pneumatic spring member 116 extends above piston member 114. Spring member 116 is movable upwardly and downwardly with respect to piston member 114 as axle 12 rotates about pivot axis 52 to maintain contact between the wheels 16 and the road surface and to provide resistance as the wheels 16 move upwardly and downwardly as arm 50 rotates about axis 52. Air pressure within pneumatic spring member 116 determines the amount of lifting force transferred from tires 16 on the road surface to that portion of middle box beam 22 contacting upper face 118 of spring member 116. Upper face 118 is connected to lower side 26 of middle box beam 22 and to the lower face of rail 30 as regards the left forward positioned axle 12. Side 120 of spring member 116 is deformable laterally to permit side-to-side rotation of axles 12 about the rotational axis with respect to middle box beam 22 corresponding to the deflection of extension members 58 within gap 74 as depicted in FIG. 8.

It can be seen from the foregoing that axle 12 is free to rotate about pivot axis 52 constrained and controlled with respect to that pivotal movement by shock absorbers 102 and spring member 116 as well as resiliently deformable bearing member 76. Axle 12 is also free to rotate in a limited manner, due to deflection of bearing member 76 in gap 74, from side to side about a vertical axis to absorb side-to-side movement of tires 16 caused by lateral forces on tires 16 as previously described. These lateral forces act on bearing member 76 to compress the regions of bearing member 76 subject to those forces. When force is released, bearing member 76 is free to return to a non-compressed normal position as when arm 50 is in parallel alignment with the direction of travel of the vehicle, as for example, when the vehicle is travelling in a straight line. Because extension members 58, upper and lower bearing housings 66 and 68 (which act as supports and which are connected to the frame by downward extension 48) and bearing member 76 extend outwardly from end 56 a sufficient distance to control and restrain lateral movement of axles 12 with respect to frame 18, no other means of controlling lateral movement of axles 12 is necessary.

Having thus described preferred embodiments of a vehicle suspension system, it will be apparent by those skilled in the art how certain advantages of the present invention have been achieved. It should also be appreciated that various modifications, adaptations, and alternative embodiments thereof may be made within the scope and spirit of the present invention. For example, while the invention has been described with respect to a bearing member 76 which is resiliently deformable, in further embodiments of the invention suitable bearings may be employed which are not resiliently deformable provided that they include a thrust component (i.e. the ability to limit movement along the axis of rotation) such as a plain bushing with a thrust face, a spherical bushing, an angular contact ball bearing, a tapered roller bearing and a spherical roller bearing., and it should be apparent that the inventive concepts described above would be equally applicable to any type of similar bearing with a thrust component. Moreover, the words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself. The definitions of the words or elements of the following claims are, therefore, defined in this specification to include not only the combination of elements which are literally set forth, but all equivalent structure. The described embodiments are to be considered illustrative rather than restrictive. The invention is further defined by the following claims.

We claim:

1. A suspension system connecting a wheel axle to a vehicle frame, comprising:
    (a) a single trailing arm connected to the wheel axle for pivotal movement with respect to the frame about a pivot axis;
    (b) a pair of coaxial extension members connected to a first end of the trailing arm and extending along the pivot axis to define a pair of trailing arm support regions displaced apart from one another along the pivot axis, at least one of the support regions positioned remote from the central longitudinal axis of the trailing arm;
    (c) a support connected to the frame extending along the pivot axis adjacent the trailing arm support regions;
    (d) a pair of extension bearing members interposed between the extension members and the support each adjacent a corresponding trailing arm support region rotatably connecting the extension members and support together, the extension bearing members acting together to restrict axial movement of the trailing arm along the pivot axis and radial movement of the trailing arm away from the pivot axis so that rotational movement of the trailing arm about an axis perpendicular to the pivot axis is restricted;
    (e) an axle connector connecting the trailing arm to the wheel axle; and
    (f) an axle connector bearing member positioned coaxially with respect to the trailing arm longitudinal axis between the trailing arm and the axle connector, the axle connector bearing member permitting rotational movement of the axle with respect to the trailing arm about the trailing arm longitudinal axis.

2. The system as described in claim 1, wherein the extension members extend in opposite directions from the trailing arm along the pivot axis and wherein the support regions are positioned on opposite sides of the trailing arm.

3. The system as described in claim 1, wherein a pair of wheels are rotatably connected to the axle on opposite sides of the central longitudinal axis of the trailing arm.

4. The system as described in claim 1, wherein the pivot axis is substantially parallel to the longitudinal axis of the axle.

5. The system as described in claim 1, wherein the pair of extension bearing members act on the extension members and the support to allow limited rotational movement of the trailing arm with respect to the frame about an axis perpendicular to the pivot axis within a predefined range of motion.

6. The system as described in claim 5 wherein the support and extension members are dimensioned to provide a gap between the support and extension members; wherein each extension bearing member is resiliently deformable and interposed in the gap between a corresponding extension member and the support; and wherein the gap and extension bearing members are of sufficient thickness to permit limited rotational movement of the trailing arm with respect to the frame about the axis perpendicular to the pivot axis, upon deflection of the extension bearing members within the gap.

7. A suspension system as described in claim 6 wherein the length of each extension member is sufficient to limit lateral rotational movement of the wheel axle about an axis perpendicular to the pivot axis within a predetermined range of movement defined by the width of the gap and the compressibility of the extension bearing members.

8. A suspension system as described in claim 7 wherein the combined length of the extension members is substantially equal to the length of the support.

9. The suspension system as described in claim 7 wherein the combined length of the extension members, the length of the support and the combined length of the extension bearing members are each substantially equal.

10. The suspension system as described in claim 6 wherein both extension members are displaced along the pivot axis from the longitudinal axis of the trailing arm.

11. The suspension system as described in claim 9 wherein the extension bearing members are deformable along their entire length.

12. The suspension system as described in claim 1 wherein the axle connector bearing member is resiliently deformable and is positioned within a gap between the axle and the axle connector, the gap being of sufficient width and the bearing member sufficiently deformable to permit the rotational movement of the axle with respect to the trailing arm.

13. The suspension system as described in claim 6 further comprising air bag suspension means connected to a second end of the trailing arm and to the frame.

14. The suspension system as described in claim 6 wherein the extension members extend in opposite directions from the trailing arm along the pivot axis and wherein the support regions are positioned on opposite sides of the trailing arm.

15. A suspension system connecting a wheel axle to a vehicle frame, comprising:
    (a) A trailing arm connected to the wheel axle;
    (b) a first connecting member fixed to one of the arm and the frame, pivotally connecting the arm to the frame for rotation of the arm with respect to the frame about a pivot axis;
    (c) a second connecting member fixed to one of the arm and the frame, pivotally connecting the arm to the frame for rotation of the arm with respect to the frame about the pivot axis;
    (d) the first and second connecting members positioned along the pivot axis in spaced relationship with respect to each other;
    (e) a pair of resiliently deformable extension bearing members interposed between the connecting members and the other of the arm and the frame to permit lateral movement of the trailing arm with respect to the frame about a vertical axis upon deflection of the extension bearing members;
    (f) an axle connector connecting the trailing arm to the wheel axle; and
    (g) an axle connector bearing member positioned coaxially with respect to the trailing arm longitudinal axis between the trailing arm and the axle connector, the axle connector bearing member permitting rotational movement of the axle with respect to the trailing arm about the trailing arm longitudinal axis.

16. The suspension system as described in claim 15 wherein the first and second connecting members are positioned on opposite sides of the arm.

17. The suspension system as described in claim 15 wherein the length of each connecting member is sufficient to limit rotational movement of the wheel axle about a vertical axis within a predetermined range of movement.

18. The suspension system as described in claim 1 wherein the axle connector bearing member encircles the trailing arm and is elongated in the direction of the longitudinal axis of the trailing arm.

* * * * *

UNITED STATES PATENT AND TRADEMARK OFFICE
CERTIFICATE OF CORRECTION

PATENT NO. : 7,077,410 B2 Page 1 of 1
APPLICATION NO. : 10/238853
DATED : July 18, 2006
INVENTOR(S) : John Stuart Gregg et al.

It is certified that error appears in the above-identified patent and that said Letters Patent is hereby corrected as shown below:

Col. 8 line 30
Claim 12, Line 3, "between the axle" should read -- between the trailing arm --.

Signed and Sealed this

Seventh Day of November, 2006

JON W. DUDAS
*Director of the United States Patent and Trademark Office*